United States Patent [19]

Brickett

[11] Patent Number: 4,809,615
[45] Date of Patent: Mar. 7, 1989

[54] METHOD AND APPARATUS FOR RE-RAILING WORKING PLATFORMS

[75] Inventor: Alan E. Brickett, Montgomery, Ala.
[73] Assignee: Kershaw Manufacturing Co., Inc., Montgomery, Ala.
[21] Appl. No.: 155,896
[22] Filed: Feb. 16, 1988
[51] Int. Cl.⁴ .................. B60S 9/12; B61K 13/00
[52] U.S. Cl. .................. 105/72.2; 104/266; 104/273; 280/763.1; 280/766.1
[58] Field of Search .......... 254/45, 419; 104/262, 104/263, 266, 272, 273; 105/72.2; 280/763.1, 765.1, 766.1

[56] References Cited

U.S. PATENT DOCUMENTS

| 3,020,858 | 2/1962 | Perkins et al. | 105/72.2 |
| 3,828,689 | 8/1974 | Raffenberg | 104/273 |
| 3,877,390 | 4/1975 | Wallace | 105/72.2 |
| 4,090,453 | 5/1978 | Ali et al. | 104/273 |

FOREIGN PATENT DOCUMENTS

| 237843 | 12/1910 | Fed. Rep. of Germany | 104/273 |
| 1481849 | 6/1969 | Fed. Rep. of Germany | 280/763.1 |
| 2135258 | 8/1984 | United Kingdom | 280/763.1 |

Primary Examiner—Andres Kashnikow
Assistant Examiner—Mark Le
Attorney, Agent, or Firm—Jennings, Carter, Thompson & Veal

[57] ABSTRACT

A railroad platform using outriggers for stability utilizes a set of detachable rollers positioned intermediate the outriggers and the platform as weight bearing members. The rollers enable the platform to move along the outrigger as needed to re-align the wheels with the railroad track.

9 Claims, 5 Drawing Sheets

4,809,615

METHOD AND APPARATUS FOR RE-RAILING WORKING PLATFORMS

FIELD OF THE INVENTION

The present invention relates to railroad equipment and more particularly to equipment including a work platform which has a plurality of extendable outriggers used for support and stability. More particularly, the present invention is concerned with the ability of such a platform to move along its outriggers to reposition itself.

BACKGROUND OF THE INVENTION

In the railroad industry it is known to provide heavy duty wrecking cranes for use in re-railing railroad equipment following a derailment or a wreck. Usually such a crane is mounted on rubber tires so that it may be transported to the vicinity of a derailment on the surface roads. At the nearest grade crossing, a set of rail engaging wheels are employed to transport the crane along the railroad track to the actual site of the derailment. The crane employs conventional truck crane out and down outriggers to attain the required stability to lift and re-rail the locomotives and cars involved in the derailment. Often times during such operations the crane is jarred out of position or shifts such that when the crane is subsequently lowered from its outriggers, the wheels do not engage the rails.

SUMMARY OF THE INVENTION

It is the object of the invention to provide means for reducing the friction between the outriggers and the crane such that the crane may be moved laterally while supported on the outriggers to realign the wheels with the rails.

It is a further object of the invention to provide a means for effecting such frictional decrease which can be rapidly employed, thereby saving both time and labor expenditures.

These and other objects of my invention are accomplished through the use of rollers detachably affixed to frame members in the crane platform such that the platform is supported on said outriggers on the rollers.

BRIEF DESCRIPTION OF THE DRAWINGS

Apparatus embodying features of my invention are depicted in the accompanying drawings which form a portion of this disclosure and wherein.

DESCRIPTION OF A PREFERRED EMBODIMENT

Figure 1:
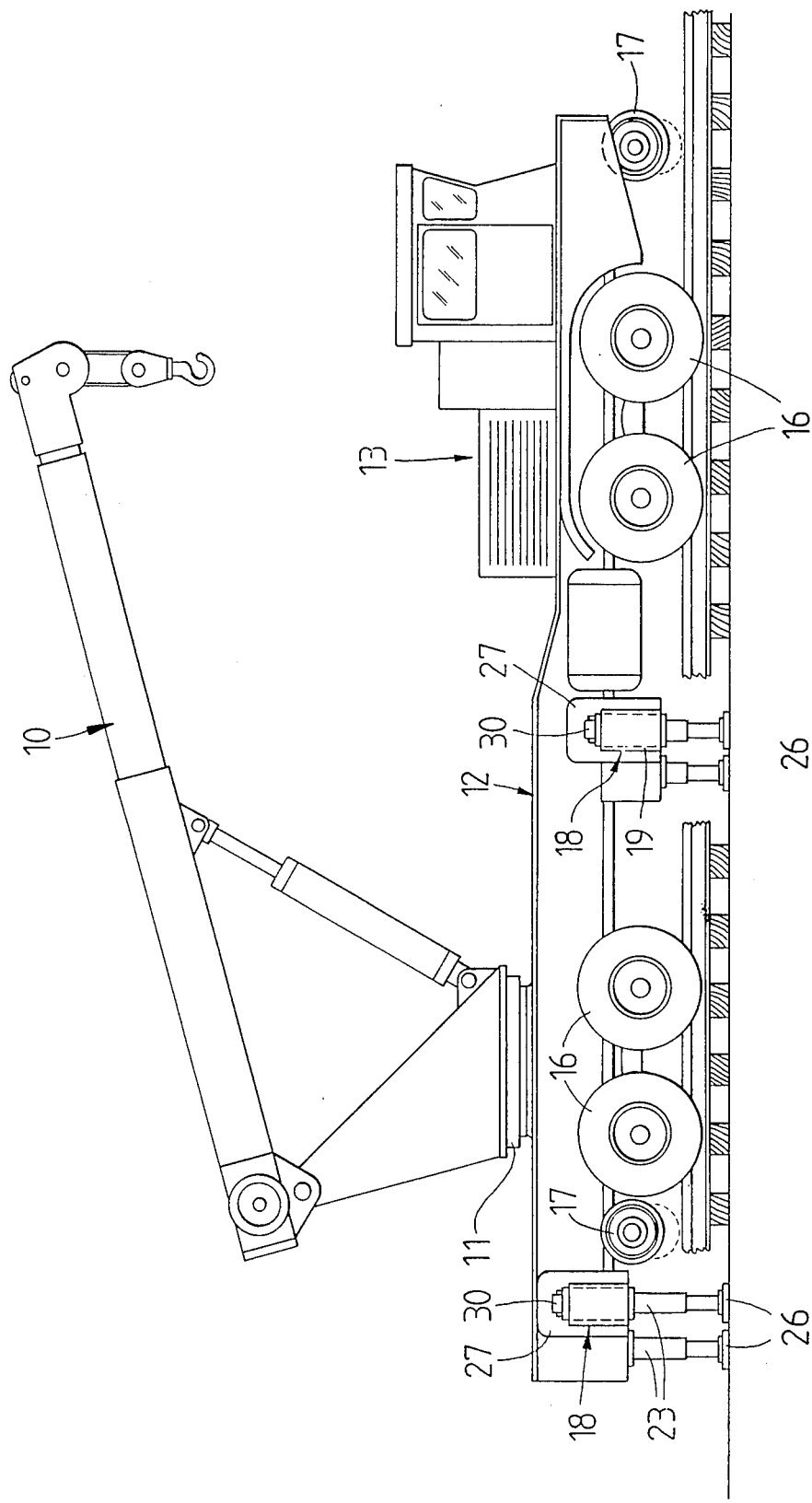
FIG. 1 is a side elevational view of a railroad crane which employs my invention.

Referring to the figures for a better understanding of my invention, it may be seen from FIG. 1 that the present apparatus is for use with very large pieces of railroad equipment. The equipment illustrated is a crane having a boom 10 and turntable 11 mounted on a work platform 12, in the form of a carriage to be pulled by a tractor 13. While my invention is particularly adapted to heavy duty wrecking cranes, it will be appreciated that it may be employed to many types of platform mounted equipment. The platform 12 is supported on rubber tires 16 for travel on roadways and on metal wheels 17, commonly referred to as "high railers", for movement along railroad tracks.

Figure 4:
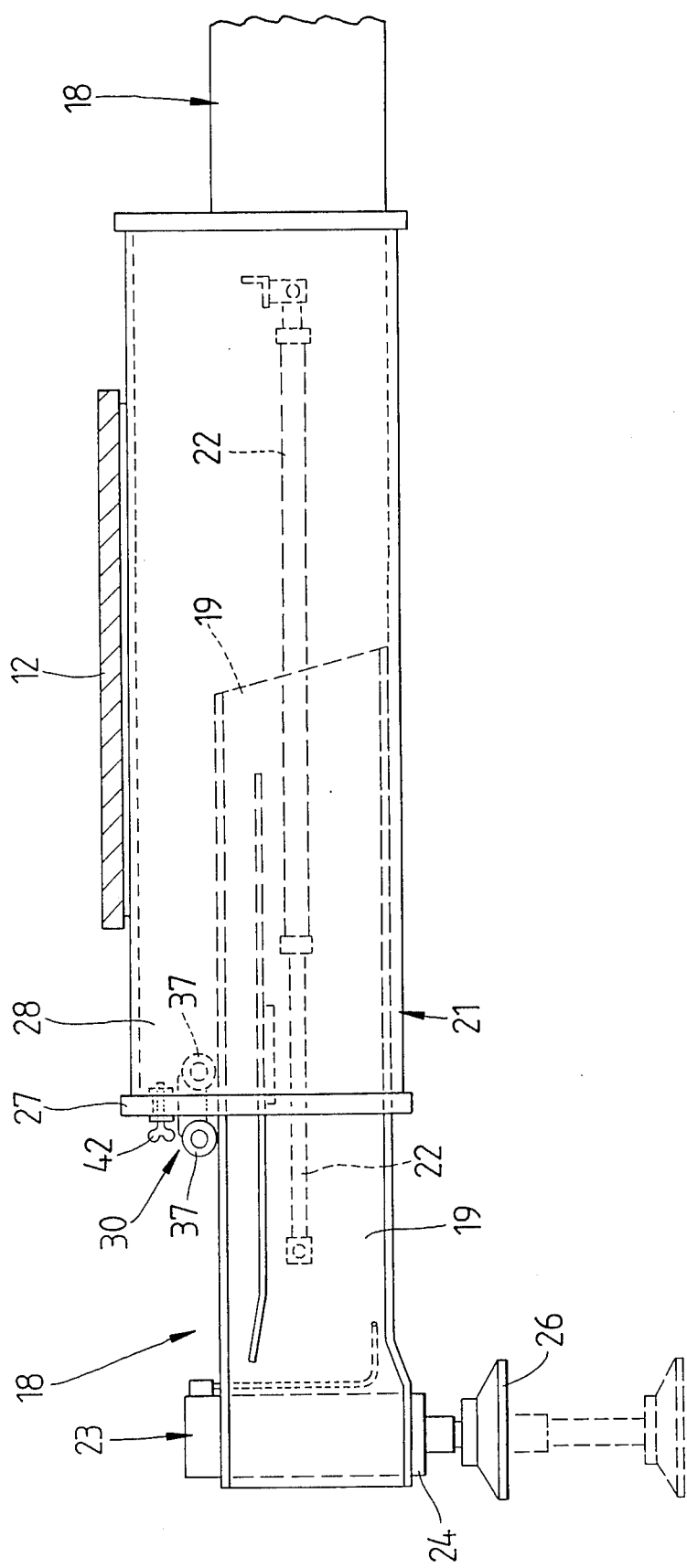
FIG. 4 is an elevational view of a portion of the outrigger structure with my invention in position.

The platform 12 utilizes a plurality of outriggers 18 on either side thereof to support and stabilize the crane 10 during operation thereof. With reference to FIGS. 1 and 4, it may be seen that each outrigger 18 utilizes a slide or beam 19 which moves horizontally within a tunnel 21 formed in the platform 12. Each beam 19 is moved by a hydraulic cylinder 22 connected between the beam 19 and the platform 12. At the outermost end of each beam is a hydraulic jack 23 including a hydraulic jack cylinder 24 and a foot 26.

Figure 2:
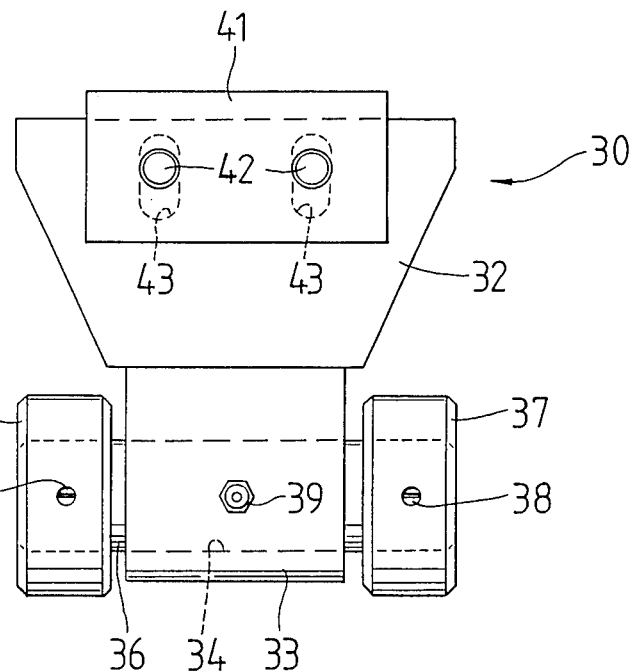
FIG. 2 is a rear elevation of a manually insertable embodiment of my invention.
Figure 3:
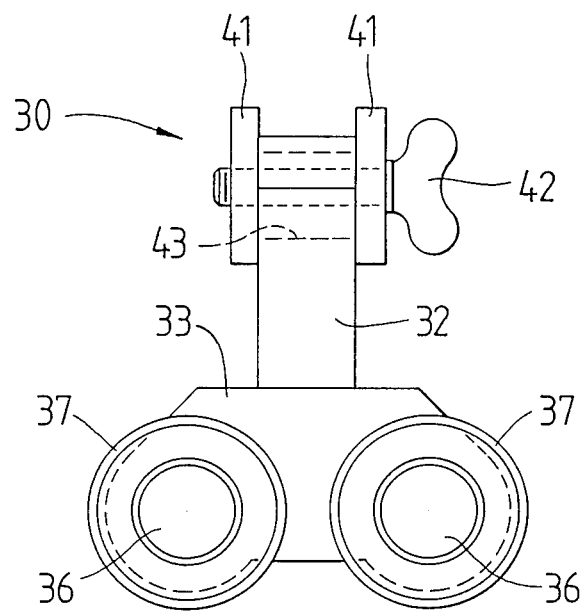
FIG. 3 is a side elevation of the apparatus shown in FIG. 2.
Figure 5:
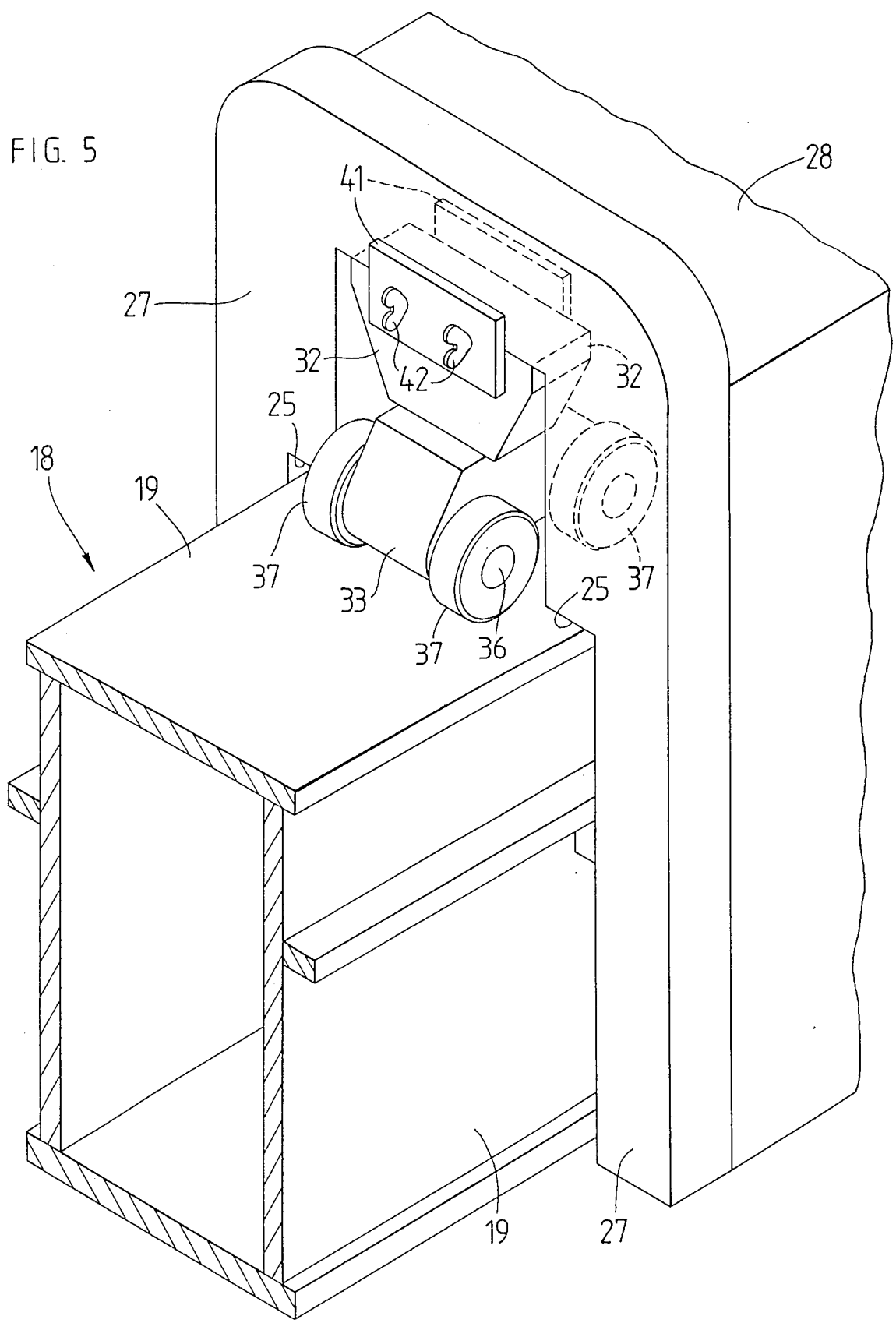
FIG. 5 is a partial perspective view of my invention interposed between the frame of the platform and an outrigger.
Figure 6:
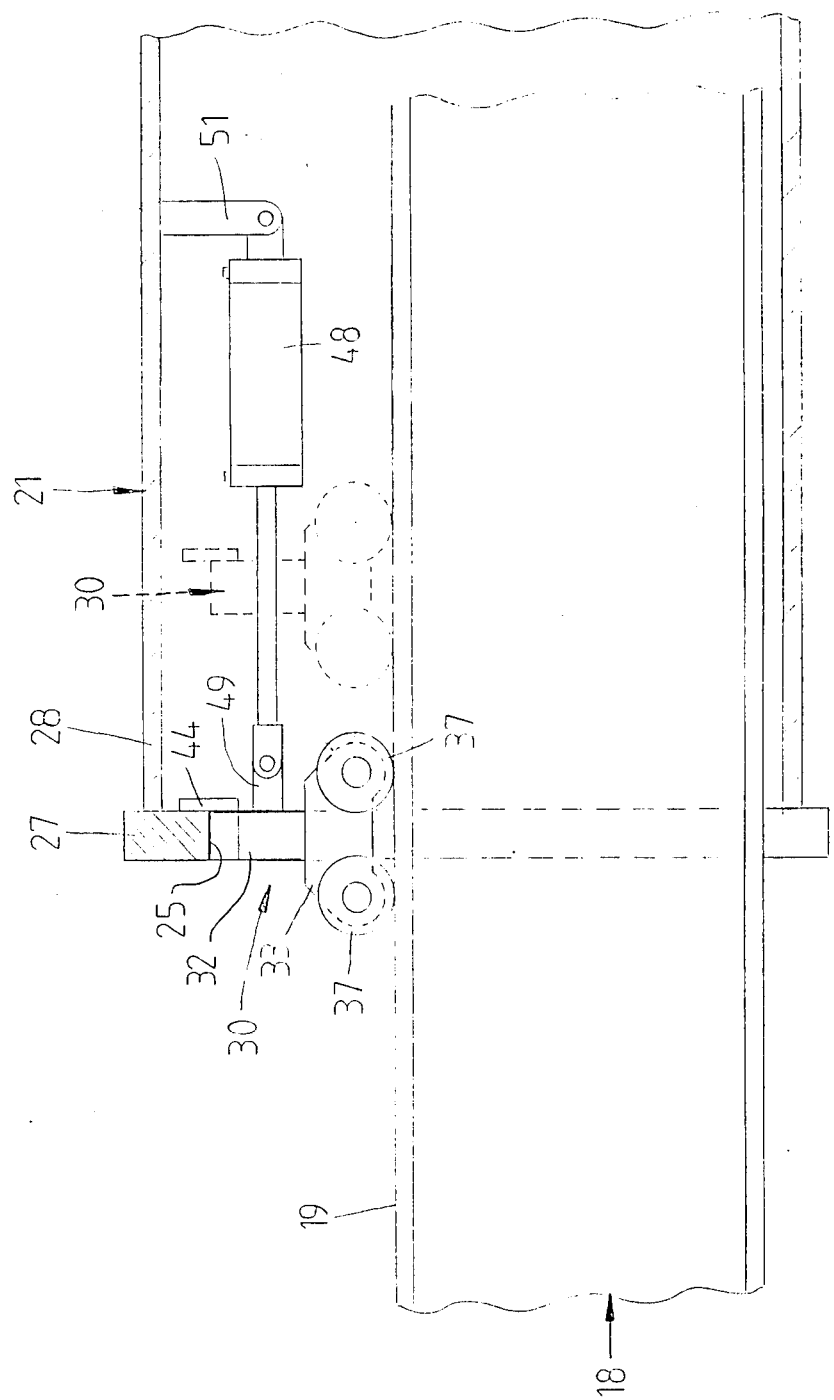

Conventionally, a tunnel 21 is formed of a plurality of horseshoe-shaped frame members 27 and horseshoe-shaped plating 28 as shown in FIGS. 4 and 5. When the platform 12 is supported on the outriggers 18 a set of shoulders 25 found in frame member 27 conventionally rest atop the beam 19 which is, of course, a weight bearing member. Due to the weight and frictional forces, it is difficult to move the platform 12 along the beams 19. My apparatus 30 reduces the friction and allows movement of the platform 12 along the beam 19. As may be seen in FIGS. 2 and 3, my apparatus comprises a carriage 31 including an upright crossmember 32 and a base 33. The base 33 has a pair of transverse bores 34 therethrough formed parallel to and on either side of crossmember 32. An axle 36 is rotatably mounted within each bore 34 and carries on its ends a pair of wheels 37, which are affixed to the axles as with set screws 38. Each axle may be lubricated via grease fitting 39. The crossmember 32 has a thickness which is equal to the thickness of frame member 27. In one embodiment a pair of locking plates 41 are mounted to crossmember 32 with a pair of threaded wing bolts 42 which passes through a vertically elongated aperture 43 in crossmember 32. The locking plates 41 may be held in position at a selected height by tightening bolt 42 which urges the plates against the sides of crossmember 32.

My apparatus is not used while the crane 12 is in use in lifting and re-railing locomotives and cars. However, when the crane 12 is finished and it is time to leave the wreck site, my apparatus is positioned beneath the frame member 27 on the beam 19. In the manual embodiment the locking plates 41 are raised and secured on either side of the frame member 27 using wing bolts 42. Note that neither bolts 42 nor locking plates 41 are load bearing members but rather the full weight of the platform 12 carried by the frame member 27 is transferred directly to the crossmember 32 thence to the wheels 37. Shoulders 25 are not in contact with the beam 19 when my apparatus 30 is in use. It will be appreciated that platform 12 will have to be lowered to remove the weight thereof from the outriggers 18 and shoulders 25 to be able to place my apparatus in its working position or to remove it therefrom. When the weight of the platform 12 is supported to my apparatus 30 and the beam 19 the hydraulic cylinders 22, normally used to extend or retract the beams 19, can be used to move the platform 12 on the beams 19 and thus re-align the wheels 17 with the rails of the track.

While I have shown my invention in one form, it will be obvious to those skilled in the art that it is not so limited but is susceptible of various changes and modifications without departing from the spirit thereof.

What I claim is:

1. In apparatus for use in railroad maintenance having a work platform supported for travel on a set of wheels engaging the rails of a railroad track and supported for work on a set of outriggers retractable to within said platform said outriggers having weight bearing components thereof movable laterally within a tunnel in said platform, said platform including a plurality of generally U-shaped frame members in said tunnel for receiving said outrigger therethrough, the improvement comprising removable friction reducing means attached to said platform such that said platform may be shifted laterally to align said rail engaging wheels with said rails including a carriage member having a central upright crossmember, with said crossmember having a thickness equal to or greater than the thickness of said U-shaped frame member, and a base member, a set of wheels supporting said base member with a pair of wheels on either side of said upright crossmember, and means for aligning said crossmember beneath said U-shaped frame member.

2. The improvement as defined in claim 1 wherein said means for aligning comprises a pair of locking plates movably attached to and parallel to said crossmember and movable vertically to engage said U-shaped plate therebetween.

3. The improvement as defined in claim 2 wherein said means for aligning further comprises a pair of threaded bolts extending through apertures in said locking plates and a pair of vertically elongated apertures in said crossmember such that rotation of said bolts urges said plates against said crossmember.

4. The improvement as defined in claim 1 wherein said wheels are connected to said base portion via a pair of axles parallel to said crossmember and of a length such that said wheels are spaced apart for supporting said carriage on said weight bearing component of said outrigger.

5. Apparatus for use with a railroad work platform having wheels which engage the rails of a railroad track, extendable load bearing outrigger members to realign said wheels on said rails, and frame members oriented at right angles to said outrigger members, comprising:
    (a) roller members for supporting said platform on said outrigger whereby said platform may be moved along said outrigger member; and
    (b) means attached to said roller members for detachably engaging said work platform including a carriage member having a central upright crossmember with a thickness equal to said frame member and a base member, and means for aligning said crossmember beneath said frame member.

6. The apparatus as defined in claim 5 wherein said means for aligning comprises a pair of locking plates movably attached to and parallel to said crossmember and movable vertically to engage said frame member therebetween.

7. The apparatus as defined in claim 6 wherein said means for aligning further comprises a pair of threaded bolts extending through apertures in said locking plates and a pair of vertically elongated apertures in said crossmember such that rotation of said bolts urges said plates against said crossmember.

8. A method for shifting a work platform having a set of wheels for engaging the rails of a track along its support outriggers wherein said outriggers are extendable from said work platform through the use of hydraulic cylinders attached between said platform and said outrigger members comprising the steps of:
    (a) lowering said platform with said outriggers extended such that the weight of said platform is not supported by said outriggers;
    (b) positioning a plurality of friction reducing members beneath frame members of said platform above said outrigger members;
    (c) raising said platform with the weight of said platform being carried by said friction reducing members, which are supported on said outrigger members; and
    (d) moving said platform along said outriggers with said hydraulic cylinders.

9. The method of claim 8 further comprising aligning the wheels of said platform with the rails of said track.

* * * * *